Sept. 19, 1944.     M. R. BRAUNS     2,358,301

GAS TURBINE

Filed July 14, 1943

INVENTOR.
MAX R. BRAUNS

Ernest E Carver

ATTORNEY

Patented Sept. 19, 1944

2,358,301

UNITED STATES PATENT OFFICE 2,358,301

GAS TURBINE

Max R. Brauns, Port Coquitlam, British Columbia, Canada

Application July 14, 1943, Serial No. 494,653

8 Claims. (Cl. 60—41)

My invention relates to improvements in gas turbines the object of which is to utilize the heat of the exhaust to increase the temperature of the air used in combustion within the turbine. Further objects are to provide means for supplying air under pressure to the combustion chamber when starting the turbine and maintaining the same volume of air at a suitable pressure when the starting motor is switched off. A still further object is to provide means for heating the air flowing to the combustion chamber by the exhaust heat from the turbine.

The invention contemplates a turbine having a combustion chamber and a blower system operated initially from a motor or other source of power to deliver air to the combustion chamber and a heat exchange system for heating the air prior to its admission to the combustion chamber, as will be more fully described in the following specification and shown in accompanying drawing, in which.

In the drawing like characters of reference indicate corresponding parts in each figure.

Figure 1:
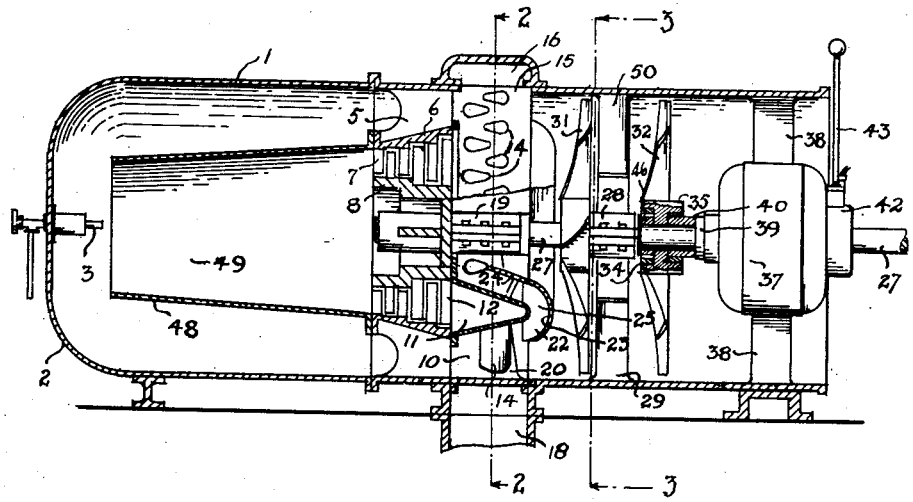
Fig. 1 is a longitudinal sectional view of the invention.
Figures 2, 3:
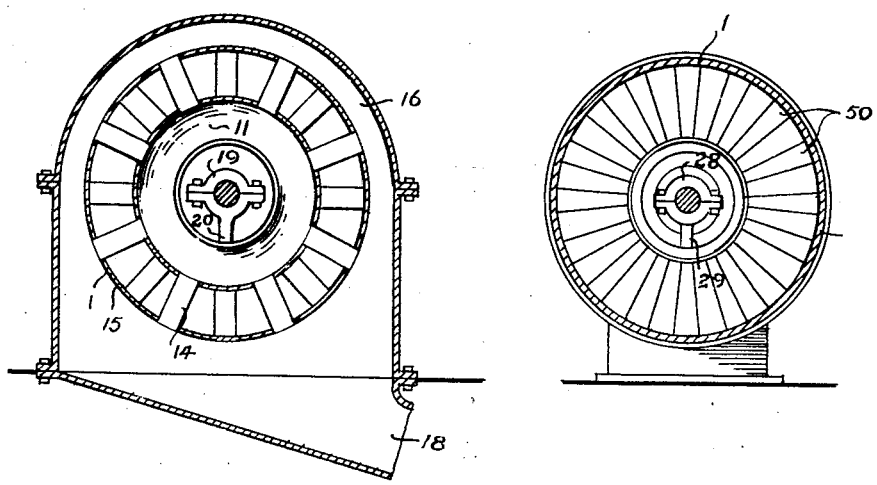
Fig. 2 is a sectional view taken on the line 2—2 of Figure 1.
Figure 3 is a sectional view taken on the line 3—3 of Figure 1 showing the stator vanes.

The numeral 1 indicates generally a cylindrical casing closed at one end with a substantially semi-spherical wall 2 in the centre of which is a fuel jet 3 directed axially of the casing.

Supported concentrically within the casing 1 within radial arms 5 is a turbine housing 6 having the necessary stator vanes 7 and rotor 8. At the discharge end of the turbine housing 6 is a discharge receiver 10 which consists of a bonnet 11 in the form of an annular V-shaped channel fitting the discharge annulus 12 of the turbine housing and a plurality of tubes 14 extending radially from the outer periphery of the bonnet 11. The tubes 14 pass through an annular band 15 which is in line with the wall of the casing 1 and the exhaust passing through said tubes pass into an exhaust duct 16 surrounding the discharge receiver. The outlet for the duct 16 is preferably arranged as at 18 below the casing 1. Formed integrally with the discharge receiver 10 is a bearing 19 supported upon a standard 20.

An annular channel 22 having a semi-circular portion 23 and a straight portion 24 is mounted adjacent the exhaust bonnet 11 to define an air passage 25, the purpose of which will hereinafter appear.

The rotor 8 is mounted upon a shaft 27 which is journalled in the bearing 19 and a similar bearing 28 which is supported on a standard 29 inside the casing. Mounted upon the shaft 27 are two fans respectively numbered 31 and 32. The former is secured upon the shaft to rotate therewith and the fan 32 is secured to the outer peripheral members 33 of two one-way clutches of any suitable type, indicated respectively by the numerals 34 and 35.

A motor generator 37 is supported within the casing upon radial arms 38 and is fitted at one end with a sleeve 39 which carries the inner member 40 of the clutch 35 so that as the motor generator is operated as a motor it will drive the fan 32. At the opposite end of the motor generator a clutch 42 having an operating lever 43 is provided to couple said motor generator to the shaft 27.

The inner member, indicated by the numeral 46, of the one-way clutch 34 is secured to the shaft 27 so that when the turbine rotor is rotating the fan 32 will be driven thereby.

Within the closed end of the casing 1 a frustum 48 is provided, which connects at its base to the turbine housing 6 to define a combustion chamber 49.

In order to increase the efficiency of the fan 31 a plurality of suitably curved stator vanes 50 are supported in a position surrounding the bearing 28 and to the windward side of the fan 32.

In starting the turbine the clutch 42 is left out, so that the motor generator 37 acting as a starting motor will through the one-way clutch 35 drive the fan 32. The fan 32 will drive air along the interior of the casing, between the tubes 14, past the turbine housing 6 to the closed end 2 of the casing and into the combustion chamber 49. Fuel entering through the end closure 2 from the jet 3 is ignited by any suitable means and the products of combustion expand to provide the power necessary to rotate the rotor 8 and the shaft 27, thus imparting rotation to the fan 31 which is secured to said shaft. As the expansion increases incidental to the heat within the frustum 48 the rotor 8 will also increase, when the rotor attains a greater speed than that of the motor the shaft 27 will, through its one-way clutch 35, take up the drive to the fan 32, thus causing the fans to function as a two stage compressor and increase the volume and pressure of the air entering the frustum, with a still further increase in shaft speed and power from the rotor resulting.

If it is desired to use the generator for producing current the clutch 42 is then thrown in, so that the shaft 27 will drive the said motor generator at shaft speed.

The air stream flowing from the fan 31 to the combustion chamber is partly diverted by the annular channel 22 to pass along the periphery of the bearing 19 to keep it cool and at a safe working temperature, then it passes around the base of the V-shaped discharge bonnet 11 and subsequently combines with the main portion of the air stream flowing between the radial tubes 14. By the arrangement thus shown, as soon as air has passed the fan 31 it absorbs a material portion of heat given off by the products of combustion, as they flow through the radial tubes 14, consequently the expansion of air is very materially increased over that which would obtain if the air were admitted to the combustion chamber 49 at substantially room temperature.

What I claim as my invention is:

1. A gas turbine comprising a casing having an end closure, a turbine within the casing remote from the end closure, the periphery of said turbine being spaced from the wall of the casing, a combustion chamber between the end closure and the turbine, a discharge bonnet attached to the discharge end of the turbine and a heat exchange structure extending radially from the bonnet for conducting the exhaust gases from the bonnet through the wall of the casing, said heat exchange structure forming a passage leading from the atmosphere to the combustion chamber.

2. A gas turbine comprising a casing having an end closure, a turbine having an axial shaft, a discharge bonnet for the turbine and a fan mounted upon the shaft all within the casing, a combustion chamber within the casing between the end closure and the turbine, said fan being adapted to deliver air under pressure around the turbine to the combustion chamber, and means between the discharge bonnet for heating the air delivered by the fan from the exhaust emanating from the discharge bonnet.

3. A gas turbine comprising a casing having an end closure, a turbine having an axial shaft, a bearing for said shaft close to the turbine, a discharge bonnet for the turbine substantially surrounding the bearing, a combustion chamber between the end closure and the turbine, means for supplying air under pressure past the discharge bonnet to the combustion chamber, and means for directing some of said air onto said bearing.

4. A gas turbine comprising a casing having an end closure, a turbine having an axial shaft, a bearing for said shaft close to the turbine, a discharge bonnet for the turbine substantially surrounding the bearing, a combustion chamber between the end closure and the turbine, means for supplying air under pressure past the discharge bonnet to the combustion chamber and means for directing some of said air onto said bearing, and means for utilizing the heat of the exhaust from the turbine for raising the temperature of the air flowing past the discharge bonnet.

5. A gas turbine comprising a turbine having a combustion chamber, a discharge bonnet and a drive shaft, a casing surrounding the turbine and its enumerated parts, an end closure for the casing adjacent the combustion chamber, said turbine parts being spaced from the casing to define an air passage to the combustion chamber, a plurality of tubes extending from the discharge bonnet and through the peripheral wall of the casing, said tubes being spaced apart to permit the flow of air to the interspace between the turbine and the casing.

6. A gas turbine comprising a turbine having a combustion chamber, a discharge bonnet and a drive shaft, a casing surrounding the turbine and its enumerated parts, an end closure for the casing adjacent the combustion chamber, a fan secured to the shaft to rotate therewith and to drive air through the casing to the combustion chamber, a second fan rotatable around the shaft and a one-way clutch interposed between said fan and the shaft whereby the second fan will be driven by the shaft to augment the air flow set up by the first named fan, a motor manually clutch connectable to the shaft and a one-way clutch interposed between the motor and the second named fan to drive it and supply air under pressure to the combustion chamber.

7. A gas turbine as claimed in claim 6 wherein the motor is mounted coaxially with the shaft and the motor has a sleeve around the shaft, and the one-way clutch between the motor and the second fan is mounted upon the motor sleeve.

8. A gas turbine comprising a turbine having a combustion chamber, a discharge bonnet and a drive shaft, a casing surrounding the turbine and its enumerated parts, an end closure for the casing adjacent the combustion chamber, a fan secured to the shaft to rotate therewith and to drive air through the casing to the combustion chamber, a second fan rotatable around the shaft, means for driving the second shaft to supply air under pressure to the combustion chamber when starting the turbine, and means as the turbine obtains running speed for driving the second fan from the turbine shaft.

MAX R. BRAUNS.